(12) United States Patent
Shirota et al.

(10) Patent No.: US 7,474,601 B2
(45) Date of Patent: Jan. 6, 2009

(54) INFORMATION RECORDING APPARATUS AND INFORMATION RECORDING METHOD

(75) Inventors: Akira Shirota, Tokorozawa (JP); Kunihiko Horikawa, Tokorozawa (JP); Eiji Muramatsu, Tokorozawa (JP); Shoji Taniguchi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 11/703,112

(22) Filed: Feb. 7, 2007

(65) Prior Publication Data

US 2007/0223340 A1 Sep. 27, 2007

Related U.S. Application Data

(62) Division of application No. 11/543,234, filed on Oct. 5, 2006, which is a division of application No. 10/237,598, filed on Sep. 10, 2002, now Pat. No. 7,139,230.

(30) Foreign Application Priority Data

Sep. 10, 2001 (JP) ............................. 2001-274358

(51) Int. Cl.
*G11B 7/00* (2006.01)
(52) U.S. Cl. .................................................. 369/59.1
(58) Field of Classification Search ................ 369/59.1, 369/59.11, 59.12, 47.51
See application file for complete search history.

(56) References Cited

U.S. PATENT DOCUMENTS

| 4,894,816 A | 1/1990 | Sukeda et al. |
| 5,396,480 A | 3/1995 | Morishita et al. |
| 5,631,887 A | 5/1997 | Hurst, Jr. |
| 5,732,062 A | 3/1998 | Yokoi et al. |
| 6,280,810 B1 | 8/2001 | Nakamura |
| 6,411,579 B2 | 6/2002 | Nobukuni et al. |
| 6,614,739 B1 | 9/2003 | Sasaki et al. |
| 7,158,460 B2 * | 1/2007 | Ogawa ................... 369/53.34 |

FOREIGN PATENT DOCUMENTS

| EP | 0 206 824 | 12/1986 |
| EP | 0 851 413 | 9/1998 |
| EP | 0 932 144 | 7/1999 |
| EP | 1 026 671 | 8/2000 |
| EP | 1 249 834 | 10/2002 |
| JP | 61-216126 | 9/1986 |

(Continued)

*Primary Examiner*—Nabil Z Hindi
(74) *Attorney, Agent, or Firm*—Young & Thompson

(57) ABSTRACT

The information recording apparatus irradiates a laser beam on a recording medium such as an optical disk and forms a recording mark corresponding to a recording signal to record information. A recording pulse signal includes a mark period irradiating the laser beam for forming the recording mark and a space period in which the recording mark is not formed. The mark period has a top pulse period and an intermediate bias period following the top pulse period. The mark period constituted by the top pulse period and the intermediate bias period does not have a continuous part of a plurality of pulses having a small pulse width unlike a pulse train, so that the correct recording mark can be stably formed on the recording medium without an inadequate deformation of a recording pulse shape, even in the case of a high speed recording.

8 Claims, 15 Drawing Sheets

FOREIGN PATENT DOCUMENTS

| | | |
|---|---|---|
| JP | 02-029928 | 1/1990 |
| JP | 2000-200418 | 7/2000 |
| JP | 2000-231719 | 8/2000 |
| JP | 2001-067669 | 3/2001 |
| WO | WO 00/74045 | 12/2000 |

* cited by examiner

LONG SPACE IS BETWEEN MARKS

SHORT SPACE IS BETWEEN MARKS

LONG SPACE - MARK - LONG SPACE

LONG SPACE - MARK - SHORT SPACE

SHORT SPACE - MARK - LONG SPACE

SHORT SPACE - MARK - SHORT SPACE

INFORMATION RECORDING APPARATUS AND INFORMATION RECORDING METHOD

FIELD OF THE INVENTION

The present invention relates to technique of recording information on an optical disk by utilizing a laser beam.

DESCRIPTION OF RELATED ART

On a recordable or re-recordable optical disk such as DVD-R a (DVD-Recordable) and a DVD-RW (DVD-Rerecordable), a laser beam is irradiated on a recording surface of the optical disk to record information. Increase in temperature of a part on the recording surface of the optical disk irradiated by the laser beam causes a change of state of an optical recording medium constituting the optical disk, which causes a recording mark to be formed on the recording surface.

The laser beam is modulated by a recording pulse having a time width corresponding to information to be recorded so that a laser pulse of a length corresponding to a signal to be recorded is generated, and the laser pulse is irradiated on the optical disk. This permits the recording mark of a length corresponding to the information to be recorded to be formed on the optical disk.

In recent years, a control technique of a laser power, in which one recording mark is formed, not by one laser pulse, but by a pulse train including a plurality of short pulses, is utilized. Such technique is known as a write strategy. Since the temperature distribution of the recording surface of the optical disk on which the recording mark is formed can be uniform, heat accumulation on the surface of the recording layer is reduced by this technique, compared with a method of irradiating a single recording pulse. As a result, it prevents that recording mark becomes a teardrop shape, and the recording mark of a preferred shape can be formed.

The above-described recording pulse train includes a plurality of pulses whose amplitude varies between a certain read power level and a write (writing or recording) power level. According to the recording signal, in an area in which the recording mark is not formed on the recording surface of the optical disk (hereinafter referred to as "space portion"), the laser beam is irradiated on the recording surface with the read power. On the other hand, in an area in which the recording mark is formed on the recording surface of the optical disk (hereinafter referred to as "mark portion"), the laser beam is irradiated on the recording surface with the power corresponding to the recording pulse train whose amplitude varies between the read power and the write power, which causes the recording mark to be formed on the recording surface.

FIG. 18 shows an example of a recording pulse shape by the above-described write strategy. The example of FIG. 18 is the recording pulse shape of a part recording the mark of 7 T in recording data. As shown in FIG. 18, the recording pulse includes one top pulse 90 and a pulse train 92 (also referred to as "multi-pulse") having a plurality of pulses 91 following the top pulse 90. The top pulse, for example, has a pulse width of 1.5 T and each pulse 91 of the pulse train 92 following the top pulse, for example, has the pulse width of 0.5 T. Both the top pulse 90 and the pulse train 92 are the pulse whose amplitude varies between two values, i.e., the write power Pw and the read power Pr.

The top pulse 90 has a role of preheating the recording surface of the optical disk for recording the mark, and heats the recording surface of the optical disk to a temperature close to a melting point by irradiating the recording laser corresponding to the top pulse 90 of the pulse width of 1.5 T. Then, the mark of a desirable length is formed on the recording surface by the pulse train 92 following the top pulse 90. The pulse train 92 includes, for example, a series of pulses 91 having the pulse width of 0.5 T (A period including an on period and an off period is 1 T.). This results in the repeating of the laser irradiation for 0.5 T, the cooling for 0.5 T, the laser irradiation for 0.5 T, . . . on the recording surface of the optical disk to control the length of the formed mark.

In the method utilizing the recording pulse shape shown in FIG. 18, when the length of the mark to be recorded is n, the recording pulse includes one top pulse 90 and the pulse train 92 having (n-3) pulses 91. By generating the above-described recording pulse corresponding to the length of the mark to be recorded to drive the recording laser, the mark of the desirable length is recorded on the recording surface of the optical disk.

According to the above-described write strategy, there is no problem in the case of recording at a normal rate. However, there is such a problem that control of the recording pulse driving the recording laser becomes difficult because a clock becomes faster in the case of high-speed recording.

In the case of high-speed recording, since the clock generating the recording pulse becomes faster itself, the period of each pulse 91 constituting the pulse train 92 becomes shorter, and the positions of the pulses 91 become closer to each other. In the part of each pulse 91 constituting the pulse train 92, since the rise-up time of the recording laser becomes longer relatively to the clock, the recording pulse becomes a kind of a pulse shape in which the pulses 91 constituting the pulse train 92 are substantially connected to each other. This causes the control of heat quantity applied to the optical disk by the laser irradiation to be difficult in the case of recording.

Generally an overshoot and an undershoot are created in a rising edge and a falling edge of a pulse shape, there is also the same phenomena in the above-described recording pulse. In the case of recording at normal rate, the overshoot and the undershoot do not influence significantly on the waveform (especially the amplitude level) of the recording pulse, because the overshoot period and the undershoot period are short compared with the pulse width of the pulse 91 constituting the pulse train 92.

However, since the width of the pulse 91 constituting the pulse train 92 becomes shorter in the case of high speed recording, the overshoot period and the undershoot period overlap the period of the pulse 91, thereby causing the amplitude level of the pulse 91 to be changed substantially. In the write strategy, the recording pulse shape is designed such that both the top pulse and the pulse train have the same amplitude level (write power level). Therefore, the heat quantity given to the optical disk cannot be precisely controlled in the case where the power level of the recording pulse is changed by such influence of the overshoot and the undershoot. As a result, the mark of an adequate shape cannot be recorded.

SUMMARY OF THE INVENTION

In view of the foregoing, it is a problem of the invention to provide an information recording apparatus and an information recording method which are capable of recording a mark of an adequate shape even in the case of recording at a high rate.

According to one aspect of the present invention, there is provided an information recording apparatus irradiating a laser beam on a recording medium and forming a recording mark corresponding to a recording signal, including: a light source emitting the laser beam, and a signal generating device which generates a recording pulse signal for driving the light source on the basis of the recording signal, wherein the recording pulse signal includes a mark period in which the recording mark is formed and a space period in which the recording mark is not formed, and the mark period includes a top pulse period having a first amplitude level corresponding to a first recording power, and an intermediate bias period having a second amplitude level corresponding to a second recording power which is lower than the first recording power and following the top pulse period.

The above-described information recording apparatus forms a recording mark corresponding to a recording signal to record information by irradiating a laser beam on a recording medium such as an optical disk. The recording pulse signal is generated on the basis of the recording signal. A light source is driven on the basis of the recording pulse signal, and the laser beam is irradiated on the recording medium.

The recording pulse signal includes a mark period irradiating the laser beam in order to form the recording mark and a space period in which the recording mark is not formed. The mark period has a top pulse period and an intermediate bias period following the top pulse period. The top pulse period has a first amplitude level corresponding to a first recording power, and the intermediate bias period has a second amplitude level corresponding to a second recording power. The first recording power is larger than the second recording power. In the top pulse period and the intermediate bias period, the laser beam is irradiated on the recording medium with power corresponding to each amplitude to form the recording mark.

The mark period constituted by the top pulse period and the intermediate bias period do not have a part of a plurality of successive pulses each having a small pulse width, and hence the correct recording mark can be stably formed on the recording medium without an inadequate deformation of a recording pulse shape, even in the case of high speed recording.

The mark period may further include a last pulse period having the first amplitude level and following the intermediate bias period. The mark period follows the intermediate bias period and includes a last pulse period having the first recording power equal to the top pulse period. The recording mark of a desirable length can be stably formed by setting adequately a time width of the top pulse period and the last pulse period, which have the first amplitude level corresponding to the first recording power, and the time width of the intermediate bias period having the second amplitude level corresponding to the second recording power.

The space period may have a third amplitude level corresponding to a read power which is lower than the first recording power and the second recording power. By this feature, in the space period, since the laser beam corresponding to a read power is irradiated, the recording mark is not formed, thereby causing space corresponding to the recording signal to be formed on the recording medium.

The signal generating device may vary at least one of a starting position and a terminating position of the top pulse period according to length of the space period before the mark period corresponding to a recorded recording mark. By this feature, the power of the laser beam irradiated on the recording medium is controlled by varying at least one of a starting position and a terminating position of the top pulse period corresponding to a length of the antecedent space period. Consequently, influence of thermal interference and optical intersymbol interference is removed, so that the recording mark having an adequate length can be formed.

The starting position of the recording mark may be adjusted coarsely by varying the starting position of the top pulse period and the starting position of the recording mark may be adjusted finely by varying the terminating position of the top pulse period. By this feature, a recording mark length can be controlled finely by setting adequately variation quantity of the starting position and the terminating position of the top pulse period.

The signal generating device may vary the terminating position of the mark period according to the length of the space period after the mark period corresponding to the recorded recording mark. By this feature, the power of the laser beam irradiated on the recording medium is controlled by varying the terminating position of the mark period corresponding to the length of the following space period. Consequently, the influence of the thermal interference and the optical intersymbol interference is removed, so that the recording mark having an adequate length can be formed.

The signal generating device may vary at least one of the starting position and the terminating position of the last pulse period according to the length of the space period after the mark period corresponding to the recorded recording mark. By this feature, the power of the laser beam irradiated on the recording medium is controlled by varying at least one of the starting position and the terminating position of the last pulse period corresponding to the length of the following space period. Consequently, the influence of the thermal interference and the optical intersymbol interference is removed, so that the recording mark having an adequate length can be formed.

The terminating position of the recording mark may be adjusted coarsely by varying the terminating position of the last pulse period and the terminating position of the recording mark may be adjusted finely by varying the starting position of the last pulse period. By this feature, the recording mark length can be controlled finely by setting adequately the variation quantity of the starting position and the terminating position of the last pulse period.

The space period may further include an off period which is located immediately after the intermediate bias period and whose amplitude level is zero. By this feature, the recording surface of the recording medium can be quenched because a laser beam level falls down to zero immediately after the intermediate bias period, which enables the influence of the thermal interference on the following recording mark to be reduced.

The space period may further include an off period which is located immediately after the last pulse period and whose amplitude level is zero. By this feature, the recording surface of the recording medium can be cooled because a laser beam level falls down to zero immediately after the last pulse period, which enables the influence of the thermal interference on the following recording mark to be reduced.

In a preferred example, the first recording power may have a value within a range of 120% to 185% of the second recording power. By this, the recording mark can be formed so as to have good characteristics of little jitter.

According to another aspect of the present invention, there is provided an information recording method irradiating a laser beam on a recording medium and forming a recording mark corresponding to a recording signal including: a step of generating a recording pulse signal on the basis of the recording signal, and a step of irradiating a laser pulse on the recording medium on the basis of the recording pulse signal, wherein the recording pulse signal includes a mark period in which the recording mark is formed and a space period in which the recording mark is not formed, and the mark period includes a top pulse period having a first amplitude level corresponding to a first recording power, and an intermediate bias period having a second amplitude level corresponding to a second recording power which is lower than the first recording power and following the top pulse period.

According to the above-described information recording method, a laser beam is irradiated on a recording medium such as an optical disk to record information by forming a recording mark corresponding to a recording signal. The recording pulse signal is generated on the basis of the recording signal, a light source is driven on the basis of the recording pulse signal to irradiate the laser beam on the recording medium.

The recording pulse signal includes a mark period irradiating the laser beam in order to form the recording mark and a space period in which the recording mark is not formed. The mark period has a top pulse period and an intermediate bias period following the top pulse period. The top pulse period has a first amplitude level corresponding to a first recording power, the intermediate bias period has a second amplitude level corresponding to a second recording power. The first recording power is larger than the second recording power. In the top pulse period and the intermediate bias period, the laser beam is irradiated on the recording medium with power corresponding to each amplitude to form the recording medium.

The mark period constituted by the top pulse period and the intermediate bias period do not have a continuous part of a plurality of pulse having a small pulse width unlike a pulse train in a conventional write strategy, so that the correct recording mark can be stably formed on the recording medium without an inadequate deformation of a recording pulse shape even in the case of high speed recording.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENTS

Preferred embodiments of the invention will be described below with referring to the accompanying drawings.

[Configuration of Apparatus]

Figure 1:
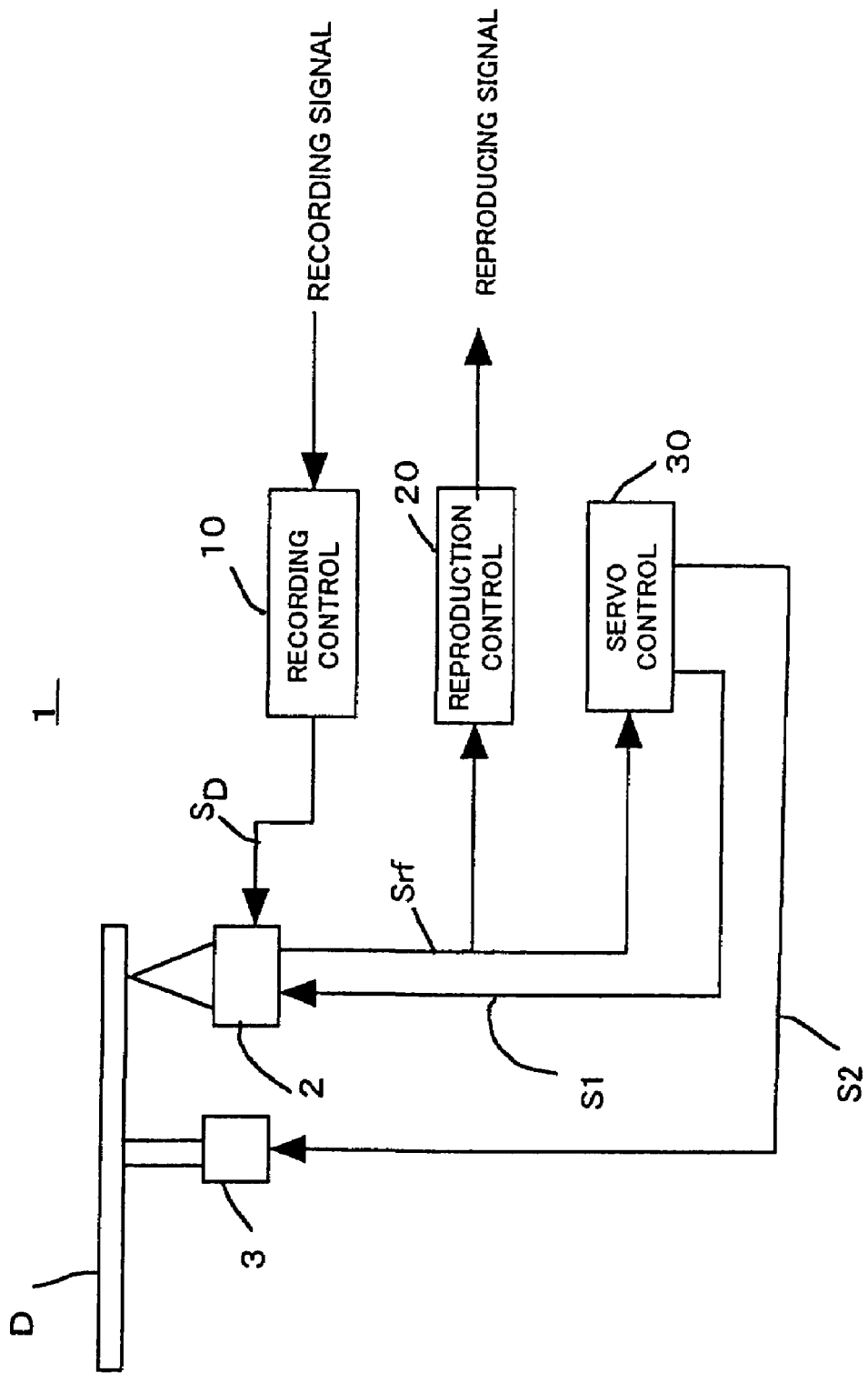
FIG. 1 is a block diagram showing a general configuration of an information recording and reproducing apparatus to which the invention is applied.

FIG. 1 shows roughly a whole configuration of an information recording and reproducing apparatus according to an embodiment of the invention. The information recording and reproducing apparatus 1 records information on an optical disk D and reproduces information from the optical disk D. Various optical disks such as, for example, CD-R (Compact Disc-Recordable) or DVD-R which is able to record information only once, and CD-RW (Compact Disc-Rewritable) or DVD-RW which is able to record information and erase information repeatedly may be used for the optical disk D.

The information recording and reproducing apparatus 1 has an optical pickup 2 for irradiating a recording beam and a reproducing beam to the optical disk D, a spindle motor 3 for controlling rotation of the optical disk D, a recording control unit 10 for controlling recording of information to the optical disk D, reproduction control unit 20 for controlling reproducing of information recorded already in the optical disk D, and a servo control unit 30 to perform various servo control including a spindle servo for controlling rotation of the spindle motor 3, and a focus servo and a tracking servo for controlling a relative position of the optical pickup 2 with respect to the optical disk D.

The recording control unit 10 receives a recording signal, generates a driving signal SD for driving a laser diode in the optical pickup 2 by a process described below, and supplies the driving signal SD to the optical pickup 2.

The reproduction control unit 20 receives a read RF signal Srf output from the optical pickup 2, performs certain processes such as a demodulation process and a decode process of the read RF signal Srf, and generates and outputs a reproducing signal.

The servo control unit 30 receives the read RF signal Srf from the optical pickup 2, supplies a servo signal S1 such as a tracking error signal and a focus signal on the basis of the read RF signal Srf to the optical pickup 2, and also supplies the spindle servo signal S2 to the spindle motor 3. This causes various servo processes such as the tracking servo, the focus servo and the spindle servo to be carried out.

Since the invention mainly relates to a recording method in the recording control unit 10 and publicly known various methods are applicable to the reproducing control and the servo control, the detailed description of them will not be made.

While the information recording and reproducing apparatus is shown in FIG. 1 as an embodiment of the invention, the invention can be also applied to an information recording apparatus which is only able to record information.

Figure 2:
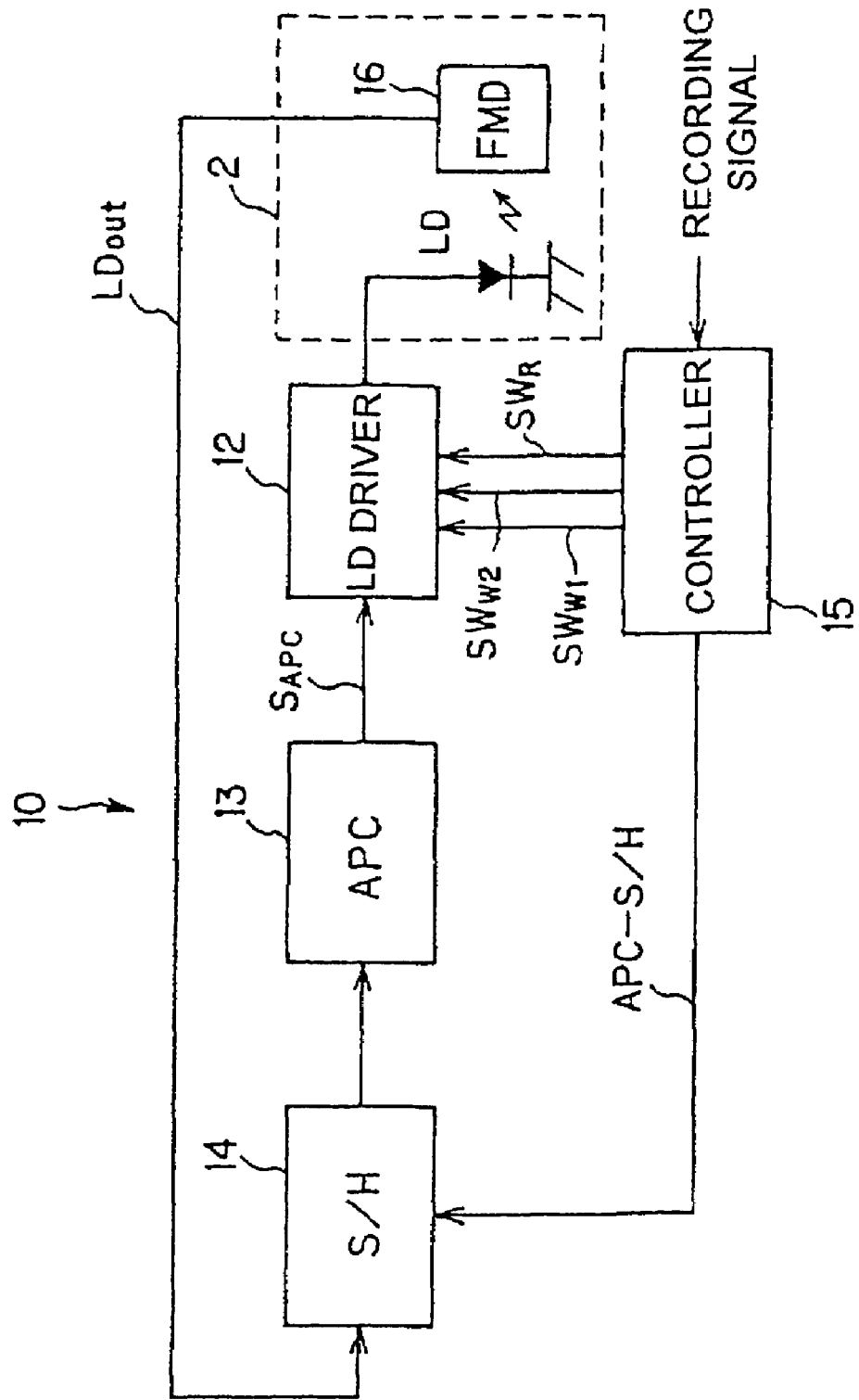
FIG. 2 is a block diagram showing a configuration of a recording control portion shown in FIG. 1.

FIG. 2 shows an internal arrangement of the optical pickup 2 and the recording control unit 10. As shown in FIG. 2, the optical pickup 2 has a laser diode LD, which generates a recording beam for recording information on the optical disk D and a reproducing beam for reproducing the information from the optical disk D, and a front monitor diode (FMD) 16 which receives the laser beam emitted from the laser diode LD and outputs a laser power level signal LDout corresponding to the laser beam.

While the optical pickup 2 also has publicly known elements such as a photodetector for receiving a reflected beam as the reproducing beam from the optical disk D to generate the read RF signal Srf, and an optical system for guiding a recording beam, the reproducing beam and the reflection beam to an adequate direction, the illustration and detailed description of them are omitted.

The recording control unit 10 has a laser diode (LD) driver 12, an APC (Automatic Power Control) circuit 13, a sample hold (S/H) circuit 14 and a controller 15.

The LD driver 12 supplies current corresponding to a recording signal to the laser diode LD to record information to the optical disk D. The front monitor diode 16 disposed near the laser diode LD in the optical pickup 2 receives the laser beam emitted from the laser diode LD to output the laser power level signal LDout showing a level of the laser beam.

The sample hold circuit 14 samples a level of the laser power level signal LDout at timing specified by a sample hold signal APC-S/H and holds it. The ARC circuit 13 performs power control of the LD driver 12 on the basis of an output signal of the sample hold circuit 14 so as to obtain a constant read power level of the laser beam emitted from the laser diode LD.

The controller 15 performs mainly recording operation and APC operation. First, the recording operation will be described. In the recording operation, the controller 15 generates switching signals SWR, SWW1 and SWW2 of a switch controlling current supplied to the laser diode LD, and supplies them to the LD driver 12.

Figure 3:
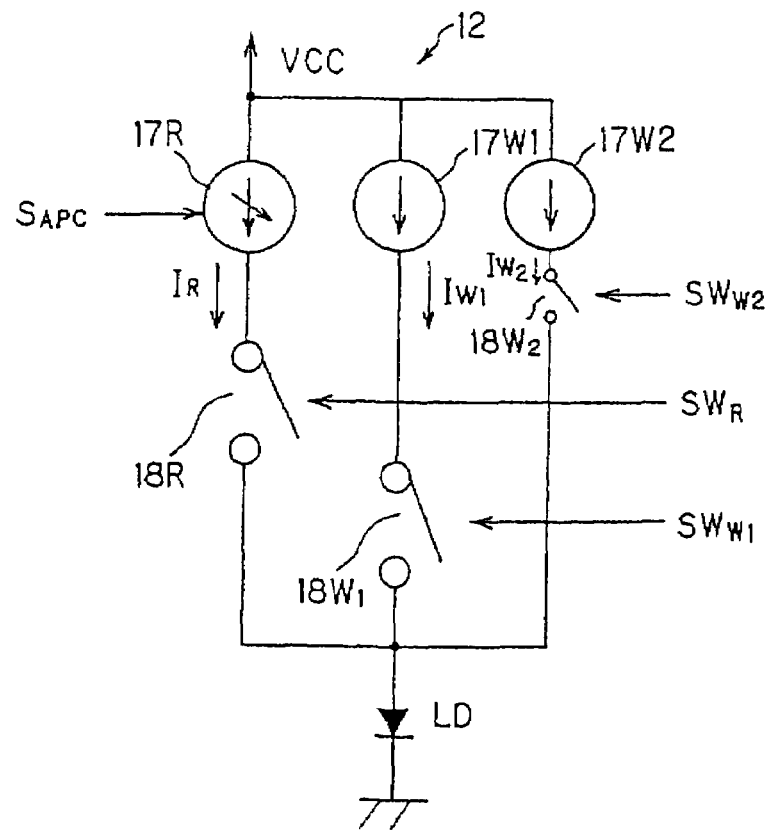
FIG. 3 shows a configuration of a LD driver shown in FIG. 2.

FIG. 3 shows a detailed arrangement of the LD driver 12. As shown in FIG. 3, the LD driver 12 has a current source 17R for a read level, current sources 17W1 and 17W2 for a write level, and switches 18R, 18W1 and 18W2.

The current source 17R for the read level supplies driving current IR for emitting the laser beam with the read power to the laser diode LD, and the driving current IR is supplied to the laser diode LD through the switch 18R. The driving current IR is supplied to the laser diode LD when the switch 18R is turned on, and the driving current IR is not supplied to the laser diode LD when the switch 18R is turned off. The magnitude of the driving current IR from the current source 17R is varied by a control signal SAPC.

The current sources 17W1 and 17W2 for the write level supply the driving currents IW1 and IW2 for emitting the laser beam with the write power to the laser diode LD, respectively. The driving current IW1 is supplied to the laser diode LD through the switch 18W1, and the driving current IW2 is supplied to the laser diode LD through the switch 18W2.

In the write strategy according to the invention, two levels of the write powers, i.e., a first write power Ph and a second write power Pm which is lower than the first write power Ph, are used. When the switch 18W1 is turned on in a state of turning on the switch 18R, the amount of the driving current of the driving current IR and IW1 is supplied to the laser diode LD, which causes the laser diode to be driven with the second write power Pm. When the switch 18W2 is turned on in a state that the switch 18R and the switch 18W1 are turned on, the driving current IW2 is further supplied to the laser diode LD, as a result, the amount of the driving current of the driving current IR, IW1 and IW2 flows to the laser diode, and the laser diode is driven by the first write power Ph. When the switch 18W1 is turned off, the supply of the driving current IW1 is stopped, and, when the switch 18W2 is turned off, the supply of the driving current IW2 is stopped.

Figure 4:
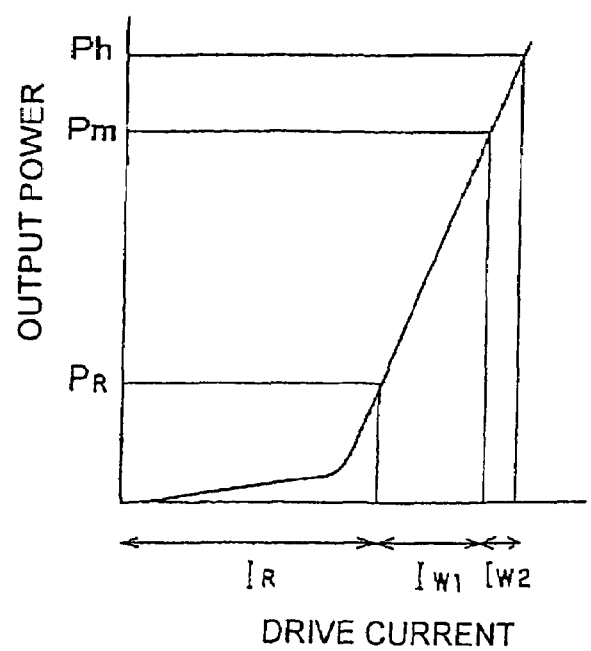
FIG. 4 is a graph showing relation between driving current given to a laser diode and an output power.

FIG. 4 shows relation between the driving current supplied to the laser diode LD and the output power of the laser beam emitted from the laser diode LD. As shown in FIG. 4, when the driving current IR is supplied to the laser diode LD, the laser beam is emitted with a read power PR. When the driving current IW1 is added, the laser beam is emitted with the second write power Pm. When the driving current IW2 is further added, the laser beam is emitted with the first write power Ph.

When information is recorded to the optical disk, basically the driving current IR is always supplied to emit the laser beam with the read power PR. The first write power Ph or the second write power Pm is further applied by adding the driving current IW1 and IW2 corresponding to a recording pulse to record the information to the optical disk.

The APC operation will be described next. The APC operation is to adjust a driving current level supplied to the laser diode from the LD driver 12 so as to obtain a constant level of the read power of the laser beam output by the laser diode LD. Specifically, in a longer space period (for example, space periods of 5 T to 11 T and 14 T) in a space portion of the recording signal (which is 8-16 modulated and has mark periods and space periods of length of 3 T to 11 T and 14 T), the driving signal SD from the LD driver 12 is adjusted so as to keep the level of the read power constant.

A concrete operation is described as follows. As described above, the controller 15 generates the recording pulse corresponding to the recording signal, and drives the LD driver 12 by the recording pulse to emit the laser beam from the laser diode LD.

The front monitor diode 16 disposed near the laser diode LD in the optical pickup 2 receives the laser beam emitted from the laser diode LD, and generates the laser power level signal LDOUT showing a level of the laser beam to supply it to the sample hold circuit 14.

The sample hold circuit 14 samples the laser power level signal LDOUT supplied from the front monitor diode 16 at timing given by the sample hold signal APC-S/H input from the controller 15, and holds the level for a certain period. The sample hold signal APC-S/H output from the controller 15 represents a period to perform the APC (referred to as "APC period").

The sample hold circuit 14 holds the level of the laser power level signal LDOUT in the APC period of the space period of the recording signal, and supplies it to the APC circuit 13. The APC circuit 13 supplies the control signal SAPC to the LD driver 12 so that the level of the laser power level signal LDOUT becomes constant in the APC period.

The control signal SAPC is input to the current source 17R for the read level in the LD driver 12 as shown in FIG. 3. This causes the current IR flowing from current source 17R for the read level to be varied in correspondence with the control signal SAPC. That is to say, the APC is performed so that the read power level obtained by the laser diode LD becomes constant.

[Write Strategy]

A write strategy applicable to the high speed recording according to the invention will be described below.

1st Embodiment of Recording Pulse Waveform

Figure 5:
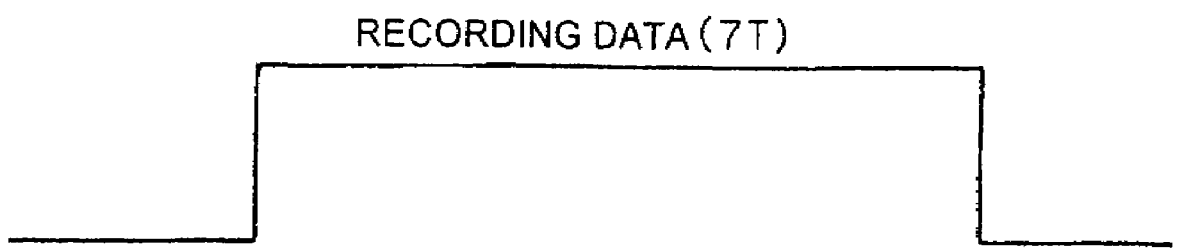
FIG. 5 is a waveform chart showing an example of a recording pulse shape according to a first embodiment of the invention.

FIG. 5 shows a first embodiment of a recording pulse waveform according to the write strategy of the invention. As shown in FIG. 5, the recording pulse waveform according to the write strategy of the embodiment includes three parts, i.e., a top pulse 40, an intermediate bias portion 41 and a last pulse 42. The recording pulse waveform is maintained at the level of the read power PR at the portions other than those three portions.

In the write strategy of the invention, two values of the write powers are used. The top pulse 40 and the last pulse 42 have the first write power Ph, and the intermediate bias portion 41 has the second write power Pm. The second write power Pm is set to be higher than the read power PR and lower than the first write power Ph.

The top pulse 40 has a role of preheating a recording surface of the optical disk for recording a mark. A time width of the intermediate bias portion 41 varies correspondingly to length of the mark to be recorded. The last pulse 42 has mainly a role of adjusting a shape of a rear end portion of the mark. Basically, the length of the mark to be recorded is controlled by a top pulse width Ttop, a last pulse width Tlp and the first write power Ph, and a mark to be recorded width is controlled by the second write power Pm.

Figure 6:
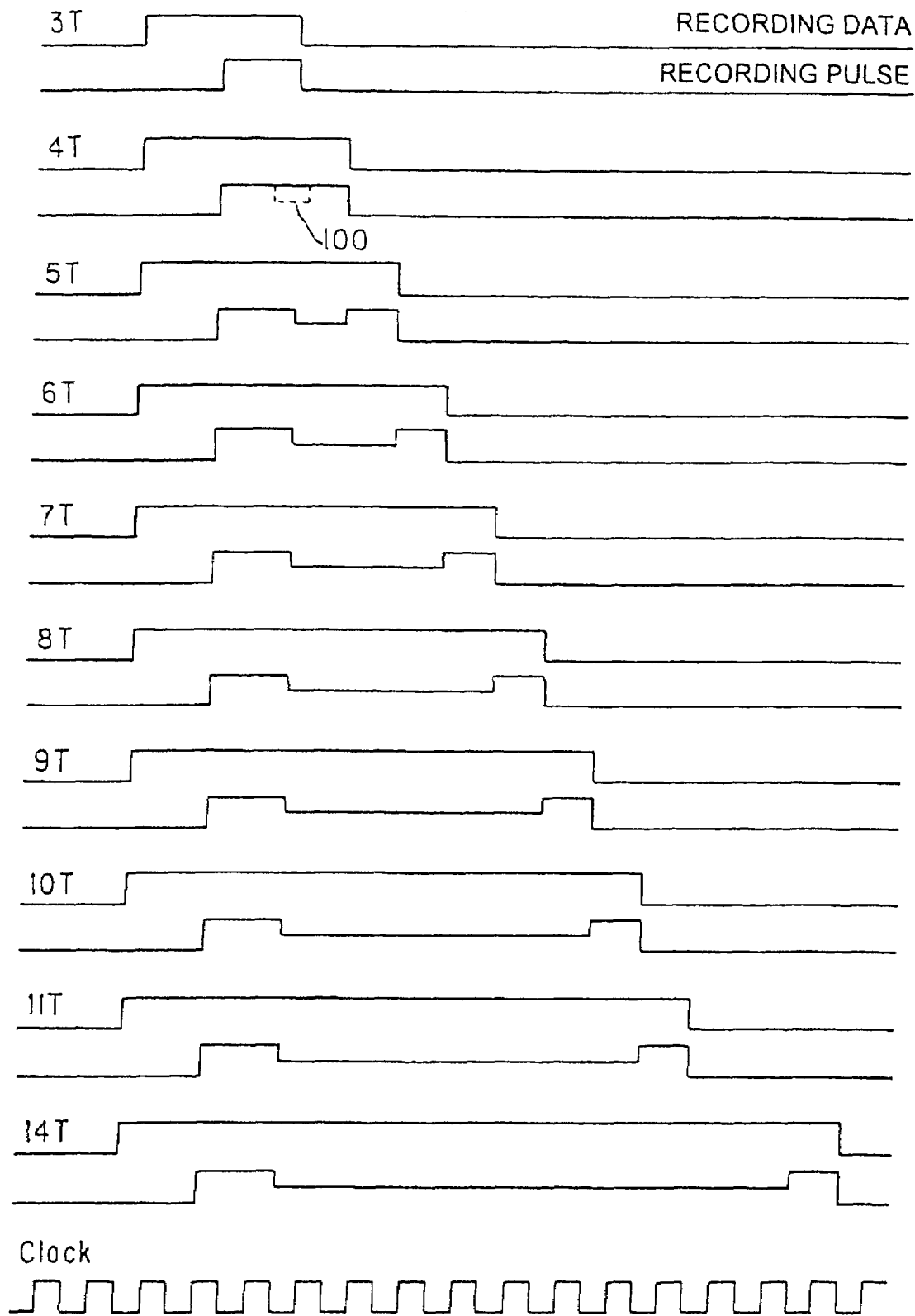
FIG. 6 is a waveform chart showing recording pulse shapes having a space length of 3 T to 14 T according to a first embodiment of the invention.

FIG. 6 shows a recording pulse shape corresponding to each mark to be recorded length. The recording data are 8-16 modulated, and have a mark period and a space period of the length of 3 T to 11 T and 14 T. As shown in FIG. 6, in the case of recording data of 3 T and 4 T, there is no intermediate bias portion 41, but there is one pulse in which the top pulse 40 and the last pulse 42 are combined. The power of the pulse is the first write power Ph, which is the same as the top pulse and the last pulse.

In the case of the recording data longer than 5 T, the width of the intermediate portion 41 increases correspondingly to the length of the recording data. Each of the pulse width of the top pulse 40 and the last pulse 42 is basically almost constant although the pulse width of the top pulse 40 and the last pulse 42 are varied to a certain extent by the control described later. The pulse width of the top pulse 40 and the last pulse 42 do not vary largely in correspondence with the recording mark, length like the intermediate bias portion 41.

Figure 18:
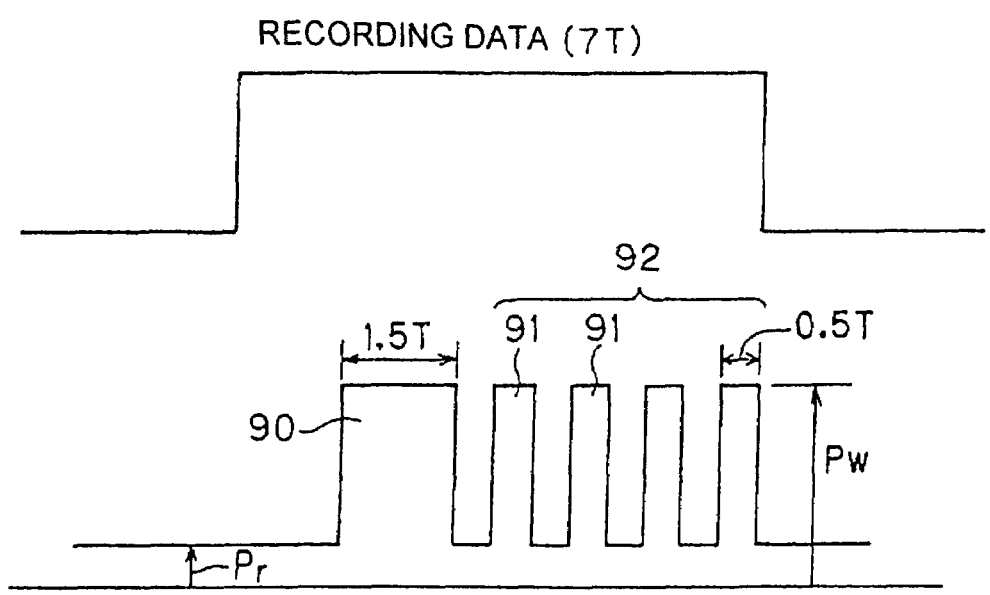
FIG. 18 is a waveform chart showing a recording pulse shape by a conventional write strategy.

In the recording pulse waveform of the embodiment, as shown in FIG. 5, there are a rise-up portion and a fall-down portion in the top pulse 40 and the last pulse 42. However, those are not successive pulses having a small pulse width, unlike the write strategy shown in FIG. 18, and there is the intermediate bias portion 41 between the top pulse 40 and the last pulse 42. Therefore, there is no influence of the rising and the falling period of the pulse waveform, and no inadequate deformation of the pulse waveform by the influence of the overshoot and the undershoot, even in the case of high speed recording.

In the example of FIG. 6, the recording pulse waveform for the 4 T recording mark has one pulse in which the top pulse and the last pulse are combined, as shown a broken line 100 in FIG. 6, the intermediate bias portion may be provided for the recording pulse waveform of the 4 T recording mark.

FIG. 6 shows examples of a recording pulse waveform for high speed recording which is four times faster than normal recording speed. When the recording speed is faster than the four times recording speed (for example, eight times recording speed or sixteen times recording speed), since a clock becomes also high speed, not only 3 T and 4 T but also the recording data more than 4 T may be a single pulse type of recording pulse waveform which does not have the intermediate bias portion.

(Adjustment of Edge Portion)

Furthermore, the write strategy according to the invention is characteristic in that a position and the pulse width of the top pulse 40 and the last pulse 42 are changed correspondingly to the space length immediately before and immediately after the mark to be recorded in order to obtain good recording characteristics.

A reason for performing such fine control is that a shape of the actually formed mark is influenced by the space length before and after the mark to be recorded. Thermal interference in the case of recording and optical intersymbol interference in the case of reproducing are main factors of the influence. The interferences will be described below.

Figure 7A:
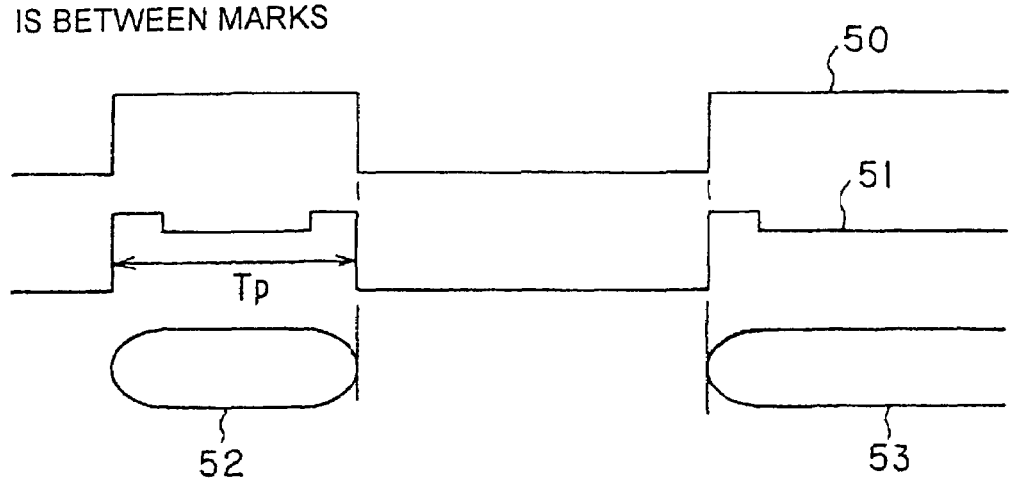
FIGS. 7A and 7B show an influence of thermal interference generated in the case of forming a recording mark.
Figure 7B:
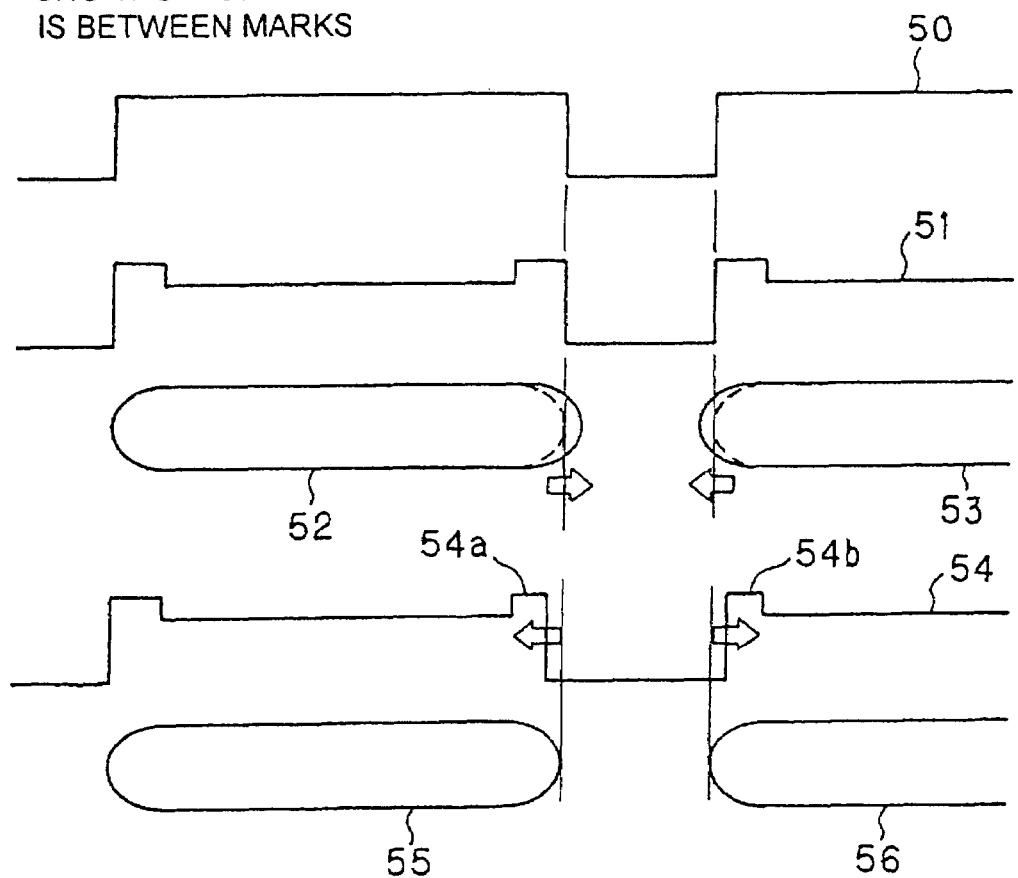

Influence of the thermal interference will be described first by referring to FIG. 7. FIGS. 7A and 7B conceptually show a recording pulse waveform and a recorded mark shape for a certain recording data. FIG. 7A shows the case where a distance between successive two marks is a long space (for example, a space more than 4 T), and FIG. 7B shows the case where a distance between successive two marks is a short space (for example, a space of 3 T to 4 T).

In FIGS. 7A and 7B, while the relation among the recording data, the recording pulse and the mark is shown in a manner that the pulse width of the recording data, the pulse width of the recording pulse and the length of the formed mark are identical, for easy comprehension, actually the pulse width of the recording data, the pulse width of the recording pulse and the mark length are not identical as shown in FIGS. 7A and 7B.

The thermal interference is such phenomenon that, when a mark is recorded, the heat given to the recording surface of the optical disk by the irradiation of the recording laser influences the recording of a next mark as residual heat. The thermal interference easily takes place when the space between the successive two marks is short, and hardly takes place when the space between the successive two marks is long. The reason is that the recording laser for a next mark recording is irradiated before the recording surface of the optical disk is sufficiently cooled down if the space from a mark to a next mark is short. If the space from a mark to a next mark is long, the residual heat becomes smaller for the next mark recording, because the recording surface of the optical disk is cooled down between two marks.

This state is shown in FIGS. 7A and 7B. As shown in FIG. 7A, in the case where the space between the marks is long, since the recording surface heated by the recording of an preceding mark 52 is cooled down prior to the recording of a next mark 53, and the recording mark of the correct length is formed (For convenience of explanation, the recording mark of the correct length is shown to be the same length as a width Tp of a recording pulse waveform 51).

On the other hand, as shown in FIG. 7B, in the case where the space between the marks is short, since the recording of the next mark 53 starts while the heat of the recording surface by the recording of the preceding mark 52 is remaining, the recording mark is extended by the influence of the residual heat. This causes a longer mark than the mark of the correct length (the correct length is the same as the width Tp of the recording pulse shape 51) to be formed. This is a state that the shape of the mark becomes inadequate by the influence of the thermal interference.

In order to remove the influence, as shown in the lowest part in FIG. 7B, it is effective that an edge of the recording pulse 54 is shifted. That is to say, in the example of FIG. 7B, a rear edge of a last pulse 54a corresponding to a preceding mark 55 is shifted forward and a front edge of a top pulse 54b corresponding to the next mark 56 is shifted backward. This permits the mark of the correct length to be formed in spite of the thermal interference by the residual heat.

Figure 8A:
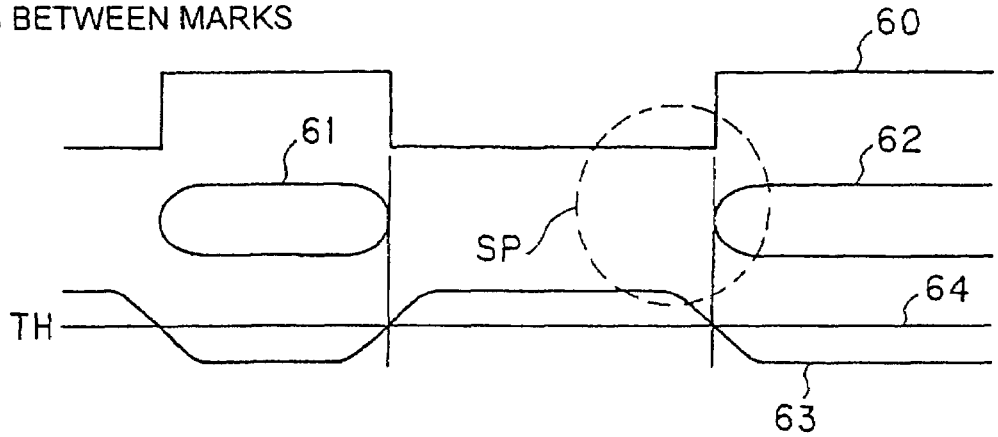
FIGS. 8A AND 8B show an influence of optical intersymbol interference generated in the case of reading a recording mark.
Figure 8B:
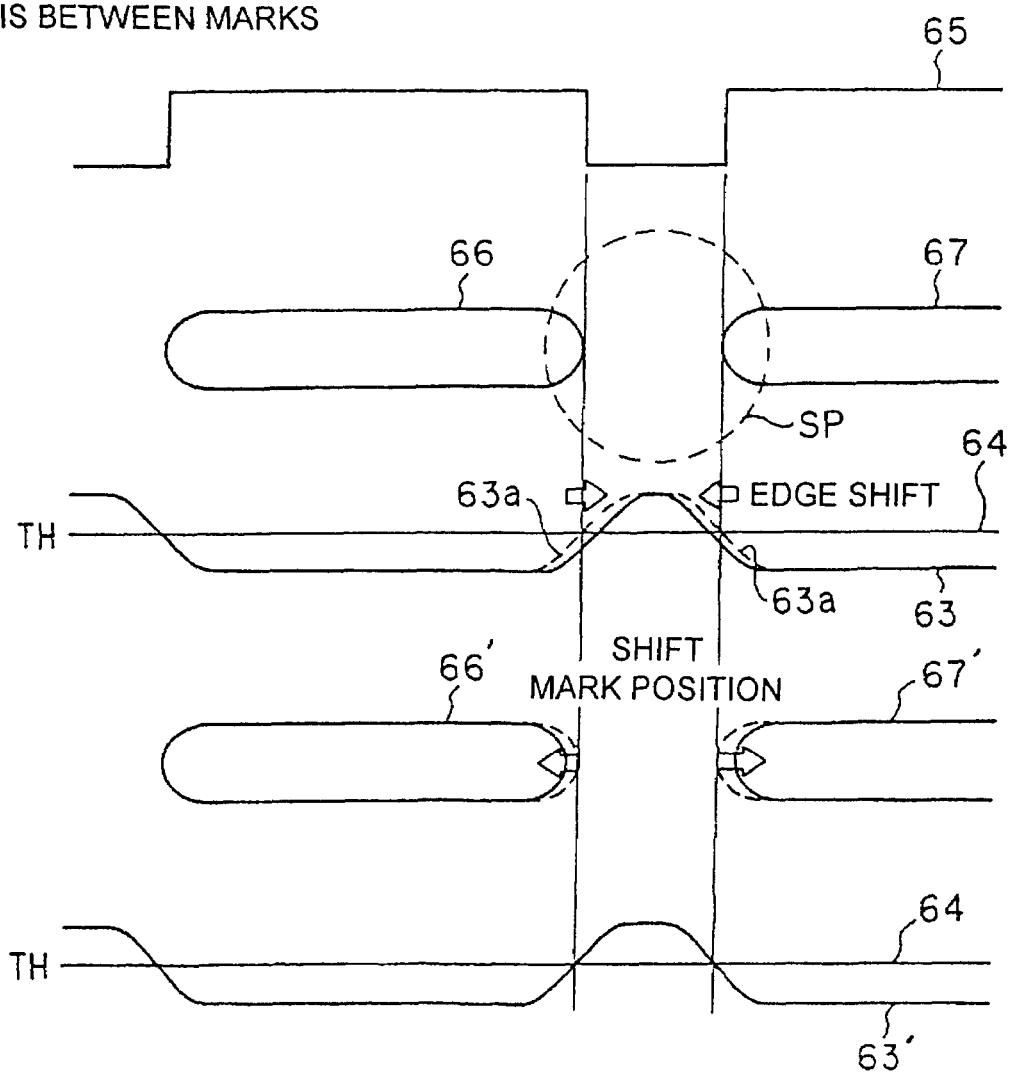

The influence of the optical intersymbol interference will be described next by referring to FIGS. 8A and 8B. FIGS. 8A and 8B show recording pulse waveforms and the shapes of recorded marks for a certain recording data. FIG. 8A shows the case where a distance between the successive two marks is a long space (for example, a space more than 4 T), and FIG. 8B shows the case where a distance between the successive two marks is a short space (for example, a space of 3 T to 4 T). In FIGS. 8A and 8B, for easy comprehension, the relation among the recording data, the recording pulse and the mark is shown in a manner that the pulse width of the recording data, the pulse width of the recording pulse and the length of the formed mark are identical. However, actually the pulse width of the recording data, the pulse width of the recording pulse and the mark length are not identical as shown in FIGS. 8A and 8B.

The optical intersymbol interference is a phenomenon that, when a space (or mark) between two marks (or spaces) is shorter than a spot diameter of a read laser beam, an amplitude level of a read signal falls (or rises) because the read laser spot covers successive two marks (or spaces) at the same time.

Detection of the recording mark is performed by irradiating the read laser beam on the recording surface and by detecting reflection quantity of light. Since the reflection of a part of the mark is lower than that of a part of the space, a level of the reflection quantity of light decreases in the part of the mark. Accordingly, the mark formed on the optical disk can be read by comparing a reproducing signal showing the reflection quantity of light with a certain threshold.

Recorded marks 61 and 62 corresponding to recording data 60 are shown in FIG. 8A. A waveform 63 is a reproducing signal waveform which is obtained by photoelectric conversion of the reflected light obtained from recording surface of the optical disk irradiated by a read spot SP. The reproducing signal waveform 63 is compared with a certain threshold (TH) level 64 to decide that a part having a lower level than the threshold level 64 is the mark. In the case of an example of FIG. 8A, since a space between the successive two marks is long (for example, more than 5 T), the read spot SP does not cover the two recording marks at the same time, which causes the correct reproducing signal corresponding to the mark length of the recording mark to be obtained.

FIG. 8B shows the case where the space between marks is short (for example, 3 T to 4 T). The marks 66 and 67 are formed correctly in correspondence with recording data 65 on the recording surface of the optical disk. However, since the space between the two marks 66 and 67 is short, the read spot SP which starts to read a front part of the mark 67 still covers a rear part of the preceding mark 66. This causes the reflection quantity of light of the read spot SP to be reduced by the rear part of the preceding mark 66, and the reproducing signal waveform, which should be a waveform of a dotted line 63a, becomes actually a waveform of a solid line 63. As a result, the mark length detected by comparison with the certain threshold level 64 becomes longer than a real length. This is the influence of the optical intersymbol interference.

In order to remove the influence, when a space between successive marks is short, it is effective that edge positions of recording marks before and after the space are shifted and a mark which is shorter than the real mark is formed. That is to say, as shown in a lower part of FIG. 8B, the marks 66' and 67' are formed little bit shorter beforehand, so that the reproducing signal of length corresponding to the real mark is obtained, if there is the influence of the optical intersymbol interference while reading.

Both the influence of the thermal interference and the optical intersymbol interference can be removed by adjusting the edge positions before and after the top pulse 40 and the last pulse 42 of the recording pulse shape shown in FIG. 5. This adjusting method is shown generally in FIG. 9 and FIG. 10.

Figure 9A:
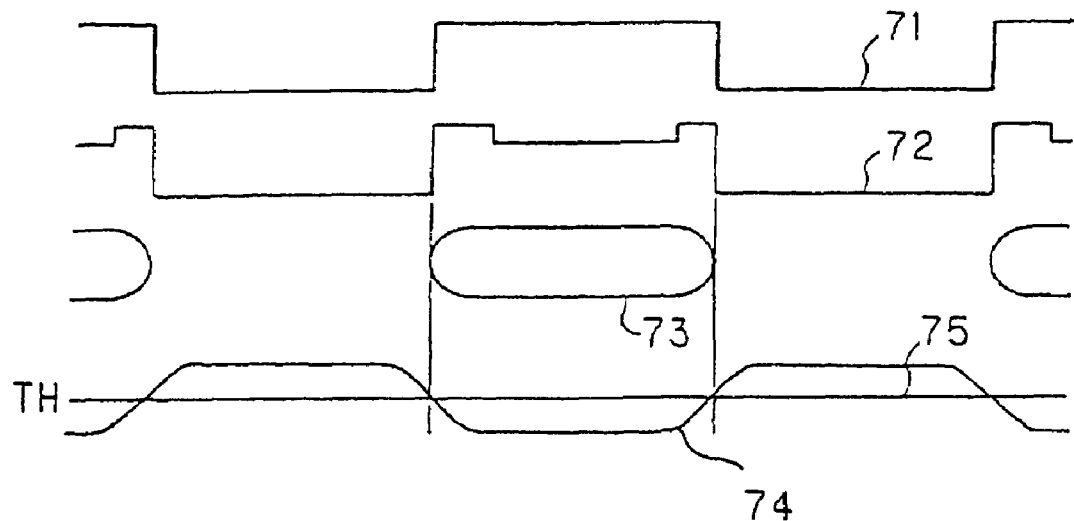
FIGS. 9A and 9B show a situation to control positions of a top pulse and a last pulse corresponding to space length before and after the positions of the top pulse and the last pulse.

FIG. 9A is the case where spaces before and after a mark to be recorded both are long. In this case, since the influence of the thermal interference and the optical intersymbol interference is nothing or small enough to be neglected as described above, a recording pulse waveform 72 having the pulse width Tp corresponding to recording data 71 is utilized. Since there is no influence of the optical intersymbol interference, a reproducing signal 74 has a correct pulse width (defined by the points crossing the threshold 75), and a recording mark of a desirable length is recorded and reproduced correctly.

Figure 9B:
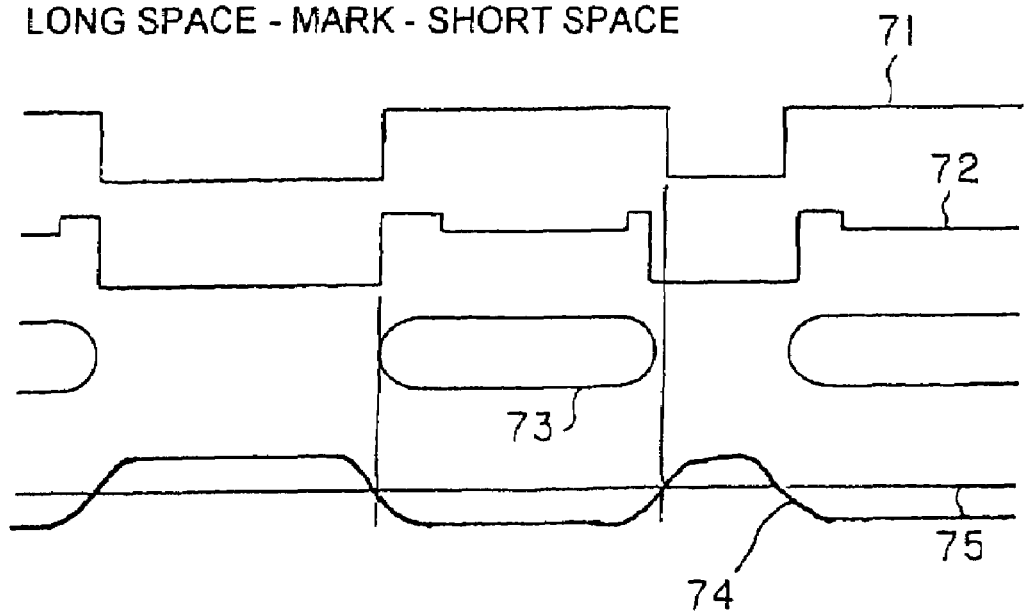

FIG. 9B is the case where a space before a mark to be recorded is long and a space after the mark to be recorded is short. In this case, since there is no influence of the thermal interference and the optical intersymbol interference before the mark to be recorded, a front edge of a top pulse of the recording pulse shape 72 corresponding to a mark 73 is identical with a rise edge of the recording data 71 and also with a point at which the reproducing signal 74 crosses the threshold level 75. On the other hand, in a part after the mark to be recorded, since a space between a next mark and the mark is short, there may be generation of the influence of the thermal interference and the optical intersymbol interference. For this reason, a rear edge of the last pulse of the recording pulse waveform is shifted forward in consideration of the thermal interference, and the mark 73 has a somewhat shorter rear edge. This results in removal of the optical intersymbol interference, and the pulse width of the reproducing signal 74 is identical to the pulse width of the recording data.

Figure 10A:
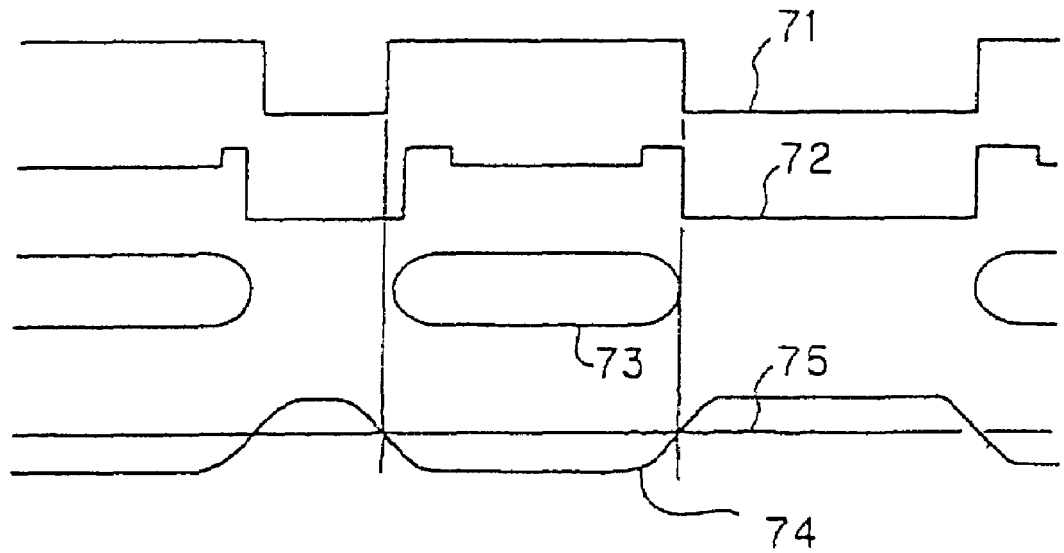
FIGS. 10A and 10B show a situation to control positions of a top pulse and a last pulse corresponding to space length before and after the positions of the top pulse and the last pulse.

FIG. 10A is the case where a space before a mark to be recorded is short and a space after the mark to be recorded is long. In this case, since there is no influence of the thermal interference and the optical intersymbol interference after the mark to be recorded, a rear edge of the last pulse of the recording pulse waveform 72 corresponding to a mark 73 is identical with a fall edge of the recording data 71 and also with a point at which the reproducing signal 74 crosses the threshold level 75. On the other hand, in a part before the mark to be recorded, since a space between a former mark and the mark is short, there may be the influence of the thermal interference and the optical intersymbol interference. For this reason, a front edge of the top pulse of the recording pulse shape 72 is shifted backward in consideration of the thermal interference, and the mark 73 has a somewhat shorter front edge. This results in removal of the optical intersymbol interference, and, the pulse width of the reproducing signal 74 (which is defined by the points crossing the threshold level 75) is identical to the pulse width of the recording data.

Figure 10B:
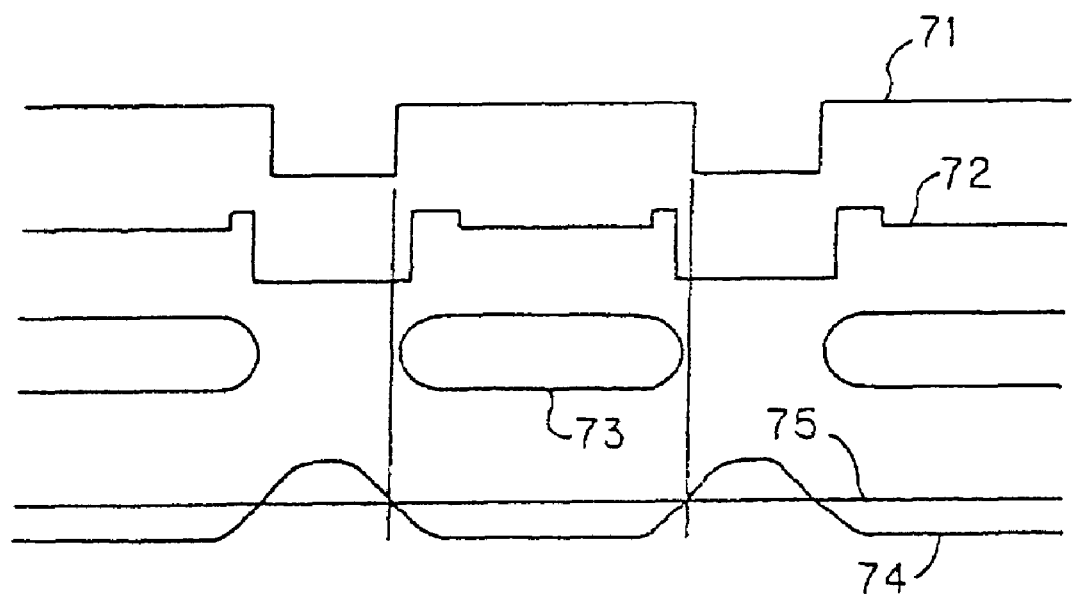

FIG. 10B is the case where spaces before and after a mark to be recorded are both short. In this case, there may be the influence of the thermal interference and the optical intersymbol interference in both sides before and after the mark to be recorded. For this reason, a front edge of the top pulse of the recording pulse shape 72 is shifted backward and a rear edge of the last pulse is shifted forward at the same time in consideration of the thermal interference, and the mark 73 has a somewhat shorter front edge and rear edge. This results in removal of the optical intersymbol interference, and an the pulse width of the reproducing signal 74 (which is defined by a point crossing the threshold level 75) is identical to the pulse width of the recording data.

In the above example explained by referring to FIG. 9 and FIG. 10, the front edge position of the top pulse or the rear edge position of the last pulse are adjusted according to the space length before and after the mark to be recorded. More concretely, the front edge position of the top pulse of the recording pulse waveform corresponding to the mark to be recorded is varied according to the space length before the mark to be recorded. And, the rear edge position of the last pulse of the recording pulse waveform corresponding to the mark to be recorded is varied according to the space length after the mark to be recorded.

Moreover, the rear edge position of the top pulse and the front edge position of the last pulse can be adjusted according to the space length before and after the mark to be recorded. In FIG. 5, an area of the recording pulse corresponds to the power of the laser beam emitted from the recording laser. If a front edge position TF and a rear edge position TR of the top pulse 40 are moved by the same time width, the movement of the front edge position TF varies the laser power more largely than the movement of the rear edge position TR. The reason is that a change in area of the recording pulse shape is larger in the case of the movement of the front edge position TF than in the case of the movement of the rear edge position TR.

Similarly, if a front edge position LF and a rear edge position LR of the last pulse 42 are moved by the same time width, the movement of the rear edge position LR varies the laser power largely than the movement of the front edge position LF. The reason is that a change in area of the recording pulse shape is larger in the case of the movement of the rear edge position LR than in the case of the movement of the front edge position LF.

When the recording power is to be adjusted largely, it is effective that the front edge TF of the top pulse 40 or the rear edge position LR of the last pulse 42 is moved. When the recording power is to be adjusted in a small amount, it is effective that the rear edge TF of the top pulse 40 or the front edge position LR of the last pulse 42 is moved. In the edge position adjustment of the top pulse and the last pulse described by referring to FIG. 9 and FIG. 10, it is possible to adjust the front edge position of the recording mark more precisely, according to the space length before the mark to be recorded, by adjusting the recording power coarsely by varying the front edge position TF of the top pulse and adjusting the recording power finely by varying the rear edge position TR of the top pulse. Similarly, it is possible to adjust the rear edge position of the recording mark more precisely, according to the space length after the mark to be recorded, by adjusting the recording power coarsely by varying the rear edge position LR of the last pulse and adjusting the recording power finely by varying the front edge position LF of the last pulse.

Figure 11:
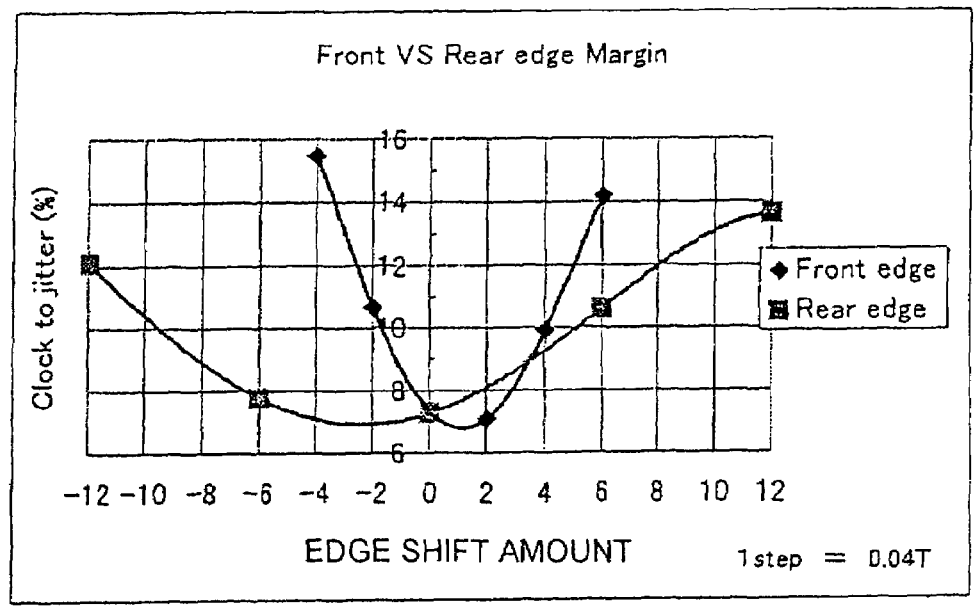
FIG. 11 is a graph showing relation between variation of edges before and after a top pulse and jitter.

FIG. 11 shows relation between movement (edge shift quantity) of the front edge position TF and the rear edge position TR of the top pulse 40 and jitter caused by the movement. As shown in FIG. 11, generation of the jitter is smaller in the case where the rear edge position TR is moved than in the case where the front edge position TF is moved. By appropriately adjusting the rear edge position TR, a position of the recording mark can be adjusted effectively while the generation of the jitter is restrained.

2nd Embodiment of Recording Pulse Waveform

Figure 12:
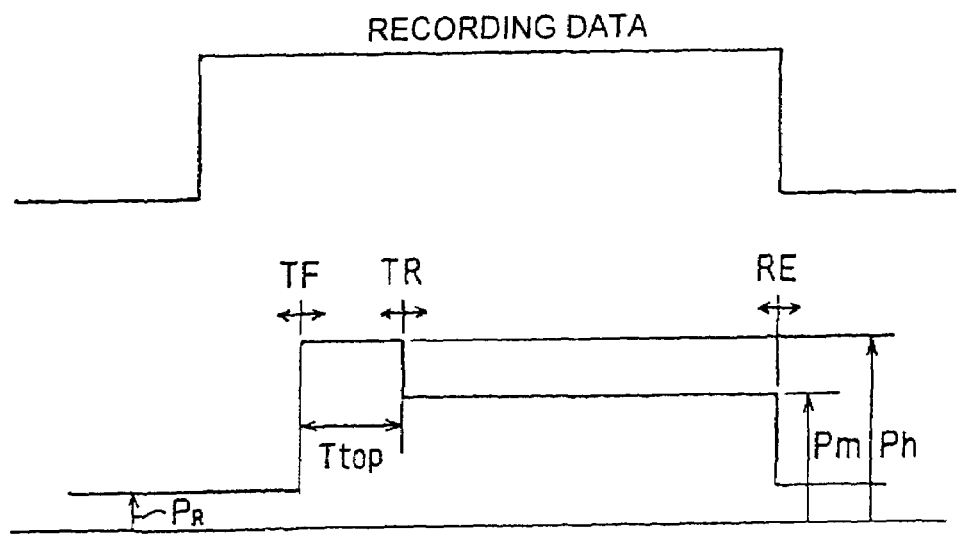
FIG. 12 is a waveform chart showing a recording pulse shape according to a second embodiment of the invention.

A second preferred embodiment of a recording pulse waveform according to the write strategy of the invention will be described. While the recording pulse waveform shown in FIG. 5 has the top pulse 40, the intermediate bias portion 41 and the last pulse 42, in the second embodiment, by omitting the last pulse 42 and extending the intermediate bias portion 41, the recording pulse waveform shown in FIG. 12 is obtained. In the recording pulse waveform in the second embodiment, there is no last pulse, and the intermediate bias portion of the amplitude level corresponding to the second write power Pm is extended to the end of the recording pulse waveform. In other points, the recording pulse waveform of the second embodiment is the same as the recording pulse waveform shown in FIG. 5.

That is to say, the amplitude level of the top pulse 40 corresponds to the first write power Ph, and the amplitude level of the intermediate bias portion 41 corresponds to the second write power Pm. An amplitude level of other parts except the top pulse 40 and the intermediate bias portion 41 corresponds to the read power PR.

Like the case of the first embodiment, the above-described influence of the thermal interference and the optical intersymbol interference can be removed by adjusting the edge position of the recording pulse. In this case, with respect to the front edge of the mark to be recorded, the front edge position TF and the rear edge position TR of the top pulse of the recording pulse corresponding to the mark to be recorded may be adjusted according to the space length of the mark to be recorded like the first embodiment.

On the other hand, with respect to the rear edge of the mark to be recorded, since there is no last pulse, a rear edge position RE (see. FIG. 12) of the recording pulse is varied according to the space length after the mark to be recorded. In this case, fine adjustment like the first embodiment cannot be performed, because only the rear edge position RE can be varied.

(Write Power Level)

A write power level of a recording pulse waveform according to the first and the second embodiment will be discussed. In the write strategy of the invention, the recording pulse has two values, i.e., the first write power Ph and the second write power Pm, in both cases of the first embodiment (FIG. 5) and the second embodiment (FIG. 12). In both embodiments, the reference value of the top pulse width Ttop is 1.75 T, and the reference value of the write pulse width Tlp is 0.5 T. The adjustment of the first write power Ph and the second write power Pm will be described below.

The adjustment of the first write power Ph and the second write power Pm includes two steps. The first step is to appropriately determine a ratio of the first write power Ph to the second write power Pm, and the second step is to determine the concrete values of the both powers. First, the ratio of the first write power Ph to the second write power Pm will be discussed.

Figure 13A:
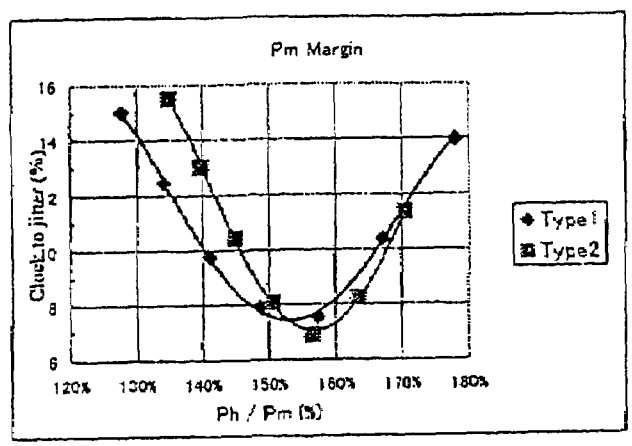
FIGS. 13A to 13C are graphs showing characteristics of jitter, degree of modulation and asymmetry for a recording pulse shape according to first and second embodiments of the invention in the case where a first write power is fixed and a ratio of the first write power to a second write power is varied.
Figure 13B:
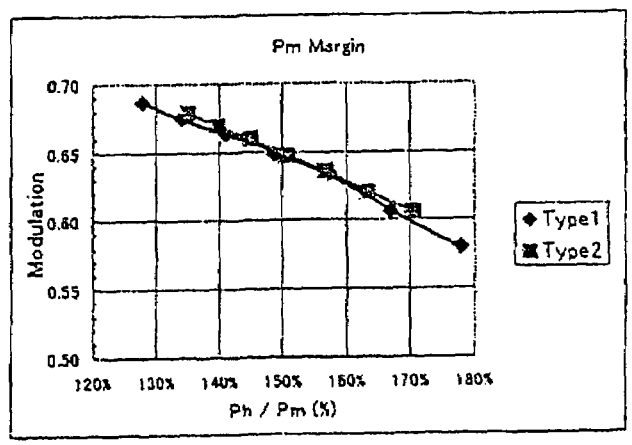
Figure 13C:
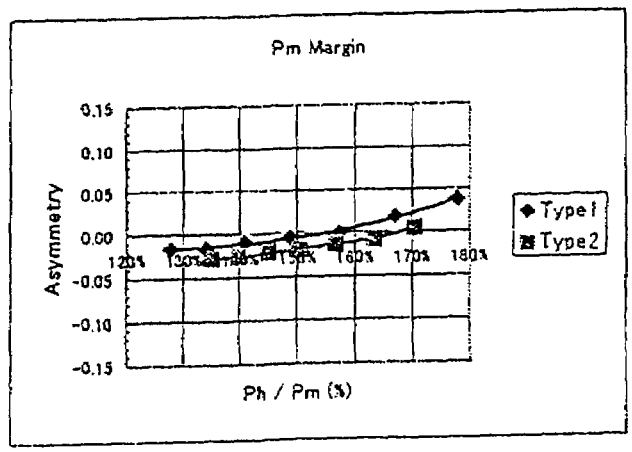

Changes in jitter (ratio of clock to jitter), modulation and asymmetry are shown in FIGS. 13A to 13C in the case where the first write power Ph is fixed at 20 mW and the second write power Pm is varied. In FIGS. 13A to 13C, the characteristics are shown as "Type 1" in the case where the recording pulse waveform of the first embodiment shown in FIG. 5 is used, and the characteristics are shown as "Type 2" in the case where the recording pulse waveform of the second embodiment shown in FIG. 12 is used.

The jitter is a value representing a degree of fluctuation of a rising edge and a falling edge of a binarized reproducing signal with respect to the PLL clock generated from the binarized reproducing signal. The higher the ratio of clock to jitter is, the worse quality of the reproducing signal is. The lower the ratio of clock to jitter. is, the better the quality of the reproducing signal is. According to the DVD-R standard, it is required that the jitter ratio is not smaller than 8.0%.

The modulation is a value representing a ratio ($I_{14}/I_{14H}$) of a difference $I_{14H}$ between a peak value and a zero level of the reproducing signal corresponding to the maximum recording mark (14 T), with respect to an amplitude 114 of the reproducing signal corresponding to the maximum recording mark. According to the DVD-R standard, it is required that the modulation is not smaller than 0.6 (60%).

The Asymmetry is a value representing a degree of deviation between the centers of the amplitudes of the minimum recording mark (3 T) and the maximum recording mark (14 T). According to the DVD-R standard, it is required that the asymmetry ranges between −0.05 and 0.15.

In FIGS. 13A to 13C, any transverse axis shows the ratio (hereinafter referred to as "write power ratio") of the first write power Ph to the second write power Pm. As can be seen from FIG. 13A, the jitter becomes minimum when the write power ratio is about 150 to 160%. Since the modulation shown in FIG. 13B increases as the write power ratio decreases, in term of the modulation, a desirable modulation can be obtained by the write power ratio. The asymmetry is almost constant irrespective of the write power ratio.

Figure 14A:
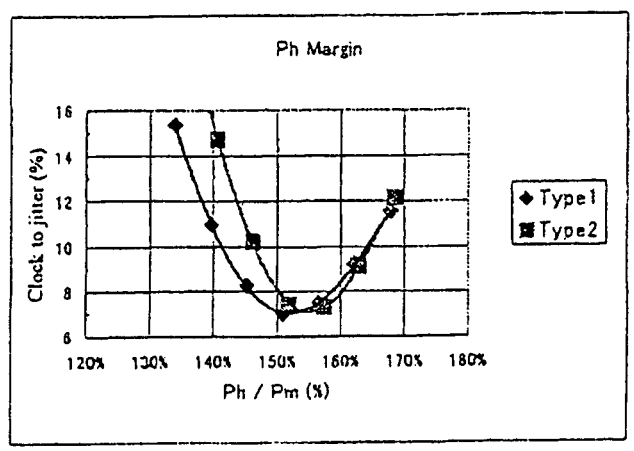
FIGS. 14A to 14C are graphs showing characteristics of jitter, degree of modulation and asymmetry for a recording pulse shape according to first and second embodiments of the invention in the case where a second write power is fixed and a ratio of a first write power to the second write power is varied.
Figure 14B:
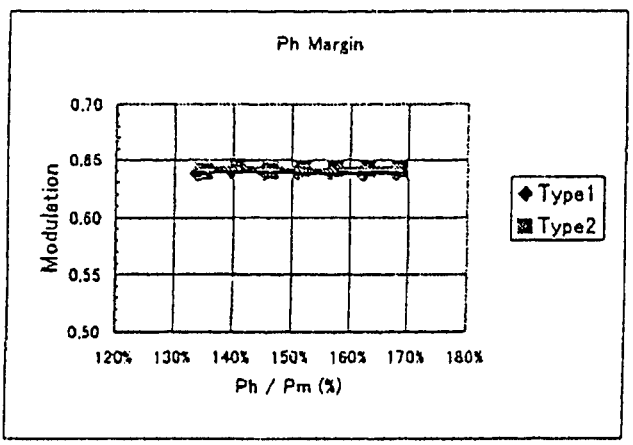
Figure 14C:
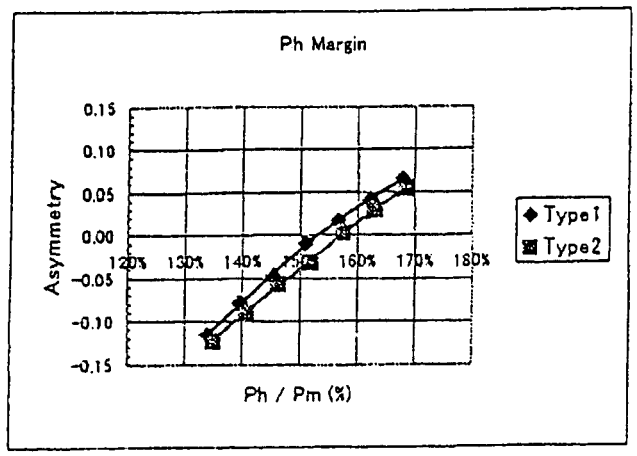

Changes in jitter, modulation and asymmetry are shown in FIGS. 14A to 14C in the case where the second write power Pm is fixed at 13 mW and the first write power Ph is varied. In FIGS. 14A to 14C, the characteristics are also shown as "Type 1" in the case where the recording pulse waveform of the first embodiment shown in FIG. 5 is used, and the characteristics are shown as "Type 2" in the case where the recording pulse waveform of the second embodiment shown in FIG. 12 is used.

As shown in FIG. 14A, it is found that the write power ratio of near 150 to 160% is also preferable, at which area the jitter becomes minimum. The modulation shown in FIG. 14B is almost constant irrespective of the variation of the write power ratio. In FIG. 14C, the write power ratio of near 150 to 160% is also preferable at which the asymmetry becomes almost zero.

As described above, it is found that the write power ratio of near 150 to 160% is preferable. That is to say, it is found that according to the above-described top pulse width and last pulse width, the first write power Ph set to be about 1.5 to 1.6 times larger than the second write power Pm is preferable.

Figure 15A:
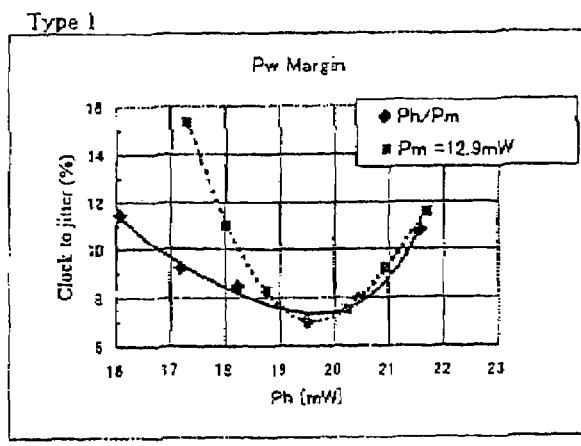
FIGS. 15A to 15C are graphs showing characteristics of jitter, degree of modulation and asymmetry for a recording pulse shape according to a first embodiment of the invention in the case where a first recording power is varied.
Figure 15B:
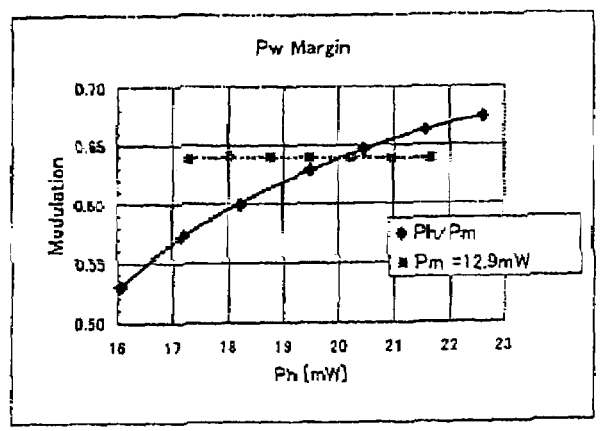
Figure 15C:
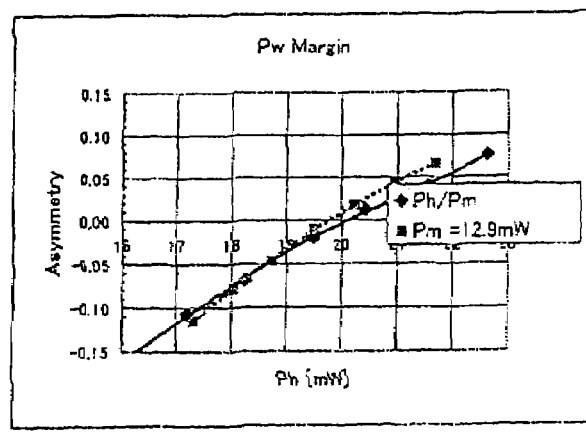

Next, values of the first write power Ph and the second write power Pm will be discussed below. FIGS. 15A to 15C show the values of the jitter, the modulation and the asymmetry by solid lines respectively when the value of the first write power Ph is varied for the recording pulse waveform (Type 1) according to the first embodiment. In each case, the write power ratio is fixed at a value of about 150% obtained from the above-described discussion. On the other hand, variations in the case where the write power ratio is not fixed is shown by dotted lines.

As shown by solid lines in FIG. 15A, it is found that when the write power ratio is fixed, though the first write power Ph is increased, the jitter does not become so bad compared with the case where the write power ratio is not fixed as shown in the dotted lines, and the power margin is increased. As shown in FIG. 15B, when the first write power Ph is increased, the modulation is increased. Therefore, in terms of the modulation, the high write power is preferred. As shown in FIG. 15C, the asymmetry has relation in almost direct proportion to the first write power Ph, and it is desirable that the first write power Ph is near 20 mW, where the value of the asymmetry becomes almost zero.

With respect to the recording pulse waveform according to the first embodiment, since variation of the first write power Ph does not largely influence the ratio of clock to jitter, the value of the first write power Ph may be decided in a manner that the both parameters come to be a permissible value in consideration of the values of the modulation and the asymmetry. In the case of FIG. 15A to 15C, for example, when the first write power Ph is set to be about 20 mW, the asymmetry becomes almost zero and the modulation becomes a good value, about 0.65 of, so that those values are preferable.

Figure 16A:
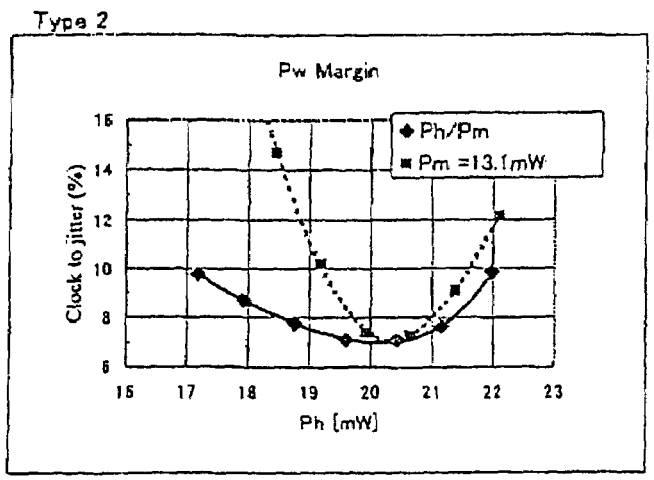
FIGS. 16A to 16C are graphs showing characteristics of jitter, degree of modulation and asymmetry for a recording pulse shape according to a first embodiment of the invention in the case where a first recording power is varied.
Figure 16B:
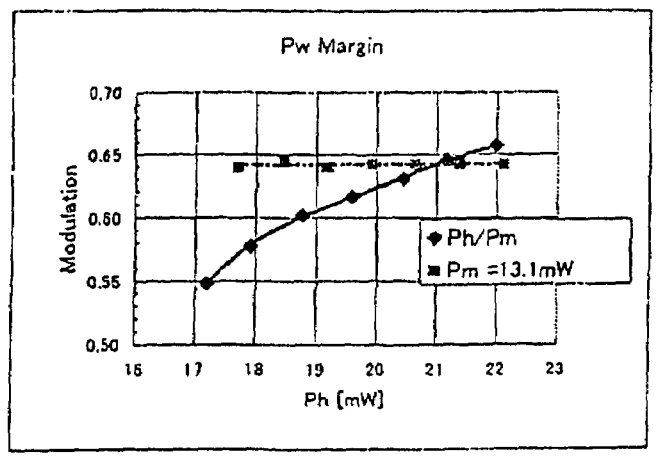
Figure 16C:
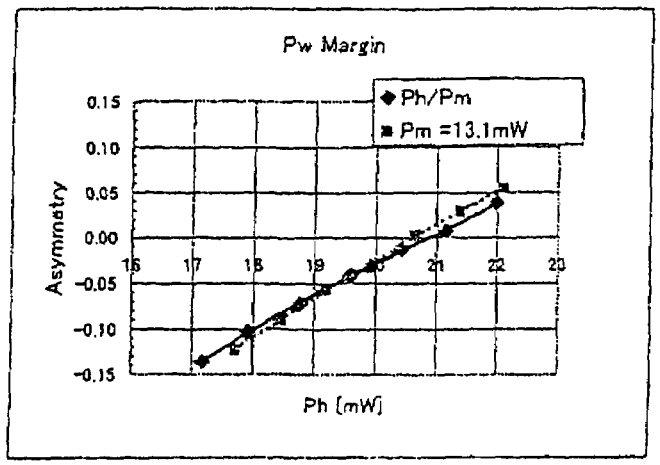

FIGS. 16A to 16C show the values of the jitter, the modulation and the asymmetry by solid lines, respectively, when the value of the first write power Ph is varied for the recording pulse waveform (Type 2) according to the second embodiment. In each case, the write power ratio is fixed at a value of about 150% obtained from the above-described discussion. Variations in the case where the write power ratio is not fixed is shown by dotted lines.

Similar tendency as FIG. 15A to 15C is found in this case. As shown by solid lines in FIG. 16A, even though the first write power Ph is increased, the jitter does not become so bad. As shown in FIG. 15B, since the second write power Pm is increased when the first write power Ph is increased, the modulation is increased. As shown in FIG. 15C, the asymmetry has relation in almost direct proportion to the first write power Ph, and it is desirable that the first write power Ph is near 21 mW, where the value of the asymmetry becomes almost zero.

With respect to the recording pulse waveform according to the second embodiment, like the first embodiment, since variation of the first write power Ph does not largely influence the jitter, the value of the first write power Ph may be decided in a manner that the both parameters come to be a permissible value in consideration of the values of the modulation and the asymmetry. In the case of FIG. 16A to 16C, for example, when the first write power Ph is set to be about 21 mW, the asymmetry becomes almost zero and the modulation becomes a good value of about 0.65, so that those values are preferable.

Difference between the case of using the recording pulse waveform according to the first embodiment and the case of using the recording pulse waveform according to the second embodiment will be discussed below. As shown in FIGS. 13A and 14A, the write power ratio when the jitter becomes minimum is about 152 to 154% in the case of the recording pulse waveform of the first embodiment and is about 156 to 159% in the case of the recording pulse waveform of the second embodiment. With respect to the asymmetry, as shown in FIG. 13C and FIG. 14C, the write power ratio when the asymmetry becomes almost zero is higher in the case of the recording pulse waveform of the second embodiment than in the case of the recording pulse waveform of the first embodiment In the case of the recording pulse waveform (FIG. 12) of the second embodiment without the last pulse, it is found that the write power ratio is preferably somewhat increased compared with the recording pulse waveform (FIG. 5) of the first embodiment with the last pulse.

With respect to the first write power Ph, as discussed above, for the recording pulse waveform of the first embodiment the first write power Ph is preferably about 20 mW, and for the recording pulse waveform of the second embodiment the first write power Ph is preferably about 21 mW. When the recording pulse waveform of the second embodiment without the last pulse is used, it is found that the write power ratio is preferably somewhat increased compared with the recording pulse waveform of the first embodiment. In this case, the second write power Pm is increased when the write power ratio is fixed.

According to the embodiments described above, the result that the specification defined by the standard is satisfied when the write power ratio is set to 150 to 160% is obtained. However, it should be noted that these values are obtained when the top pulse width Ttop is 1.75 T and the last pulse width Tlp is 0.50 T, and the preferable write power ratio may be varied in the range of 120 to 185% in correspondence with the values of the top pulse width Ttop and the last pulse width Tlp. According to experiment by the applicant of the present invention, it is found that the write power ratio is preferably set to about 120% in the case where the top pulse width Ttop is 2.3 T and the last pulse width Tlp is 0.50 T, and the write power ratio is preferably set to about 185% in the case where the top pulse width Ttop is 1.4 T and the last pulse width Tlp is 0.80 T.

[Modification]

A third embodiment according to the write strategy of the invention will be described below referring to FIG. 17. In the third embodiment of the write strategy, output power of the recording laser is temporarily fallen to a zero level to cool the optical disk immediately after the recording pulse corresponding to the recording mark. This permits the influence of the thermal interference in formation of the following recording mark to be reduced.

Figure 17:
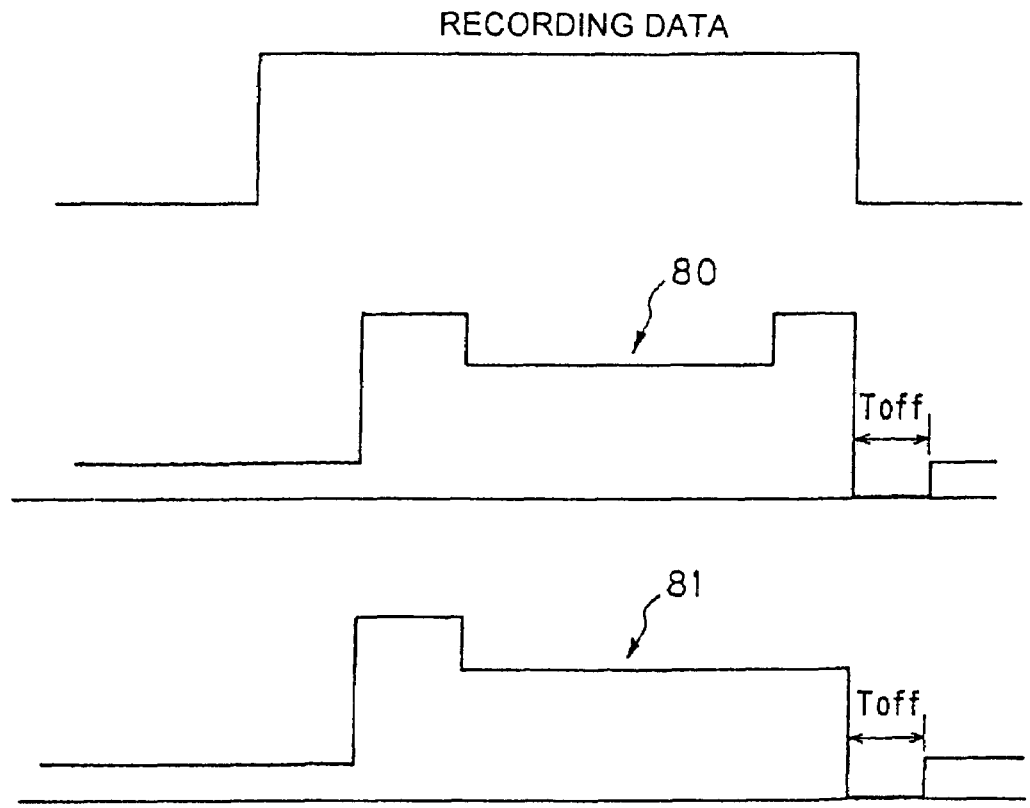
FIG. 17 is a waveform chart showing a recording pulse shape according to a third embodiment of the invention.

In FIG. 17, the recording pulse waveform obtained by applying the technique of the third embodiment to the recording pulse waveform of the first embodiment is shown as a waveform 80, and the recording waveform obtained by applying the technique of the third embodiment to the recording pulse waveform of the second embodiment is shown as a waveform 81.

In both cases, the recording pulse waveform itself is the same as the recording pulse waveforms of the first embodiment and the second embodiment, and in a certain period Toff immediate after the recording pulse waveform, the recording pulse level is fallen to the zero level to turn off the laser output.

If such an off period is provided, the influence of the residual heat can be reduced even though the space between a next mark and the mark is small. By providing the off period like the embodiment, heat quantity can be adjusted by a larger unit in the case where the rear edge LR of the last pulse in the recording pulse shape of the first embodiment or rear edge RE of the recording pulse shape of the second embodiment is moved according to the following space length. The reason is that the heat quantity of the laser irradiated on the optical disk is largely reduced by existence of the off period in the case where the rear edge LR or the rear edge RE is moved by the same time width.

As described above, according to the invention, a recording pulse waveform includes a top pulse, an intermediate bias portion and last pulse, or the top pulse and the intermediate bias portion. Hence, a part in which a plurality of pulses having a small pulse width continue is not contained unlike a pulse train in a conventional write strategy. Consequently, even in the case of making a clock faster for high speed recording, the influence of a rise and a fall, and overshoot and undershoot of the recording pulse shape on a recording mark can be reduced.

Further, each of front edge positions and rear edge positions of the top pulse and the last pulse can be controlled independently according to a space length before and after the mark to be recorded, so that length and a width of the recording mark can be controlled independently.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Applications No. 2001-274358 filed on Sep. 10, 2001 including the specification, claims, drawings and summary is incorporated herein by reference in its entirety.

What is claimed is:

1. An information recording apparatus irradiating a laser beam on a recording medium and forming a recording mark corresponding to a recording signal, comprising:

a light source which emits the laser beam;

a signal generating device which generates a recording pulse signal; and a control device which drives the light source on the basis of the recording pulse signal to irradiate laser pulses on the recording medium, wherein the recording pulse signal includes a mark period in which the recording mark is formed, and a space period in which the recording mark is not formed, wherein the recording pulse signal, to form the recording mark not longer than a predetermined length, includes a first-type recording pulse having a single amplitude level, wherein the recording pulse signal, to form the recording mark longer than the predetermined length, includes a second-type recording pulse having a top pulse with a first amplitude level corresponding to a first recording power, and an intermediate bias portion having a second amplitude level corresponding to a second recording power which is lower than the first recording power and continuously existing from a terminating position of the top pulse to a terminating position of the second-type recording pulse, wherein the second amplitude level of the intermediate bias portion is constant, and wherein the top pulse of the second-type recording pulse has a constant width irrespective of the length of the recording mark.

2. The information recording apparatus according to claim 1, wherein the recording pulse signal in the space period has a third amplitude level which is lower than the first recording power and the second recording power.

3. The information recording apparatus according to claim 1, wherein the signal generating device varies at least one of a starting position and a terminating position of the top pulse according to a length of a recording mark to be recorded.

4. The information recording apparatus according to claim 3, wherein the starting position of the recording mark is adjusted coarsely by varying the starting position of the top pulse, and the starting position of the recording mark is adjusted finely by varying the terminating position of the top pulse.

5. An information recording method irradiating a laser beam from a light source on a recording medium and forming a recording mark corresponding to a recording signal, the method comprising the steps of:

generating a recording pulse signal on the basis of the recording signal; and irradiating a laser pulse on the recording medium on the basis of the recording pulse signal by driving the light source, wherein the recording pulse signal includes a mark period in which the recording mark is formed and a space period in which the recording mark is not formed, wherein the recording pulse signal to form the recording mark not longer than a predetermined length includes a first-type recording pulse having a single amplitude level, wherein the recording pulse signal, to form the recording mark longer than the predetermined length, includes a second-type recording pulse having a top pulse with a first amplitude level corresponding to a first recording power, and an intermediate bias portion having a second amplitude level. corresponding to a second recording power which is lower than the first recording power and continuously existing from a terminating position of the top pulse to a terminating position of the second-type recording pulse, wherein the second amplitude level of the intermediate bias portion is constant, and wherein the top pulse of the second-type recording pulse has a constant width irrespective of the length of the recording mark.

6. The information recording method according to claim 5, wherein the recording pulse signal in the space period has a third amplitude level which is lower than the first recording power and the second recording power.

7. The information recording method according to claim 5, wherein the step of generating the recording pulse signal varies at least one of a starting position and a terminating position of the top pulse according to a length of a recording mark to be recorded.

8. The information recording method according to claim 7, wherein the starting position of the recording mark is adjusted coarsely by varying the starting position of the top pulse, and the starting position of the recording mark is adjusted finely by varying the terminating position of the top pulse.

* * * * *